Figure 1B:
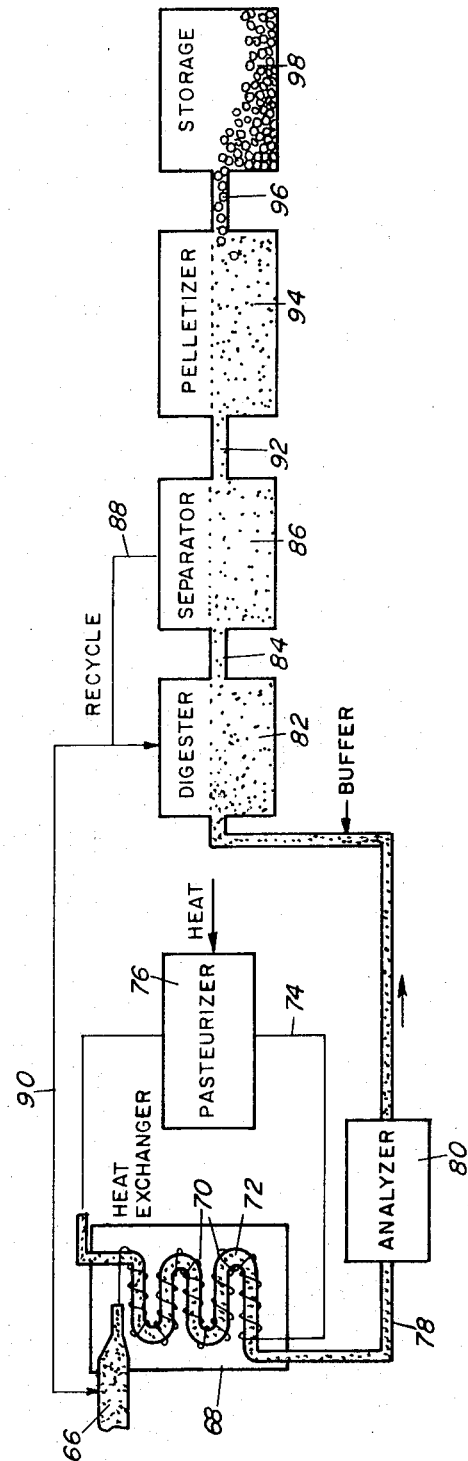

United States Patent

Trussell

[15] 3,655,046

[45] Apr. 11, 1972

[54] MUNICIPAL WASTE DISPOSAL

[72] Inventor: Harry B. Trussell, Carthage, Mo.

[73] Assignee: Fermbionics, Inc., Joplin, Mo.

[22] Filed: Mar. 11, 1970

[21] Appl. No.: 18,505

[52] U.S. Cl..........................................210/11, 71/13, 99/2, 210/12, 210/73, 210/152, 210/403
[51] Int. Cl..........................................C02c 1/02
[58] Field of Search................71/13, 14; 210/2, 10, 152, 210/403, 73, 195, 9, 11, 12; 99/2

[56] References Cited

UNITED STATES PATENTS

| | | | |
|---|---|---|---|
| 1,518,256 | 12/1924 | D'Olier | 71/13 |
| 2,798,800 | 7/1957 | Geraghty et al | 71/14 X |
| 3,296,122 | 1/1967 | Karassik et al | 210/2 |
| 3,323,896 | 6/1967 | Brown | 71/14 X |
| 3,440,949 | 4/1969 | Trussell | 210/152 X |

Primary Examiner—Michael Rogers
Attorney—John J. Byrne

[57] ABSTRACT

A system for disposing of municipal waste including garbage and sewage which converts the garbage portion into a matrix filter which is used to separate the liquids and solids in the sewage. The liquids are purified in a normal manner, for example by aeration, and the solids are converted into a food material suitable for livestock consumption.

10 Claims, 2 Drawing Figures

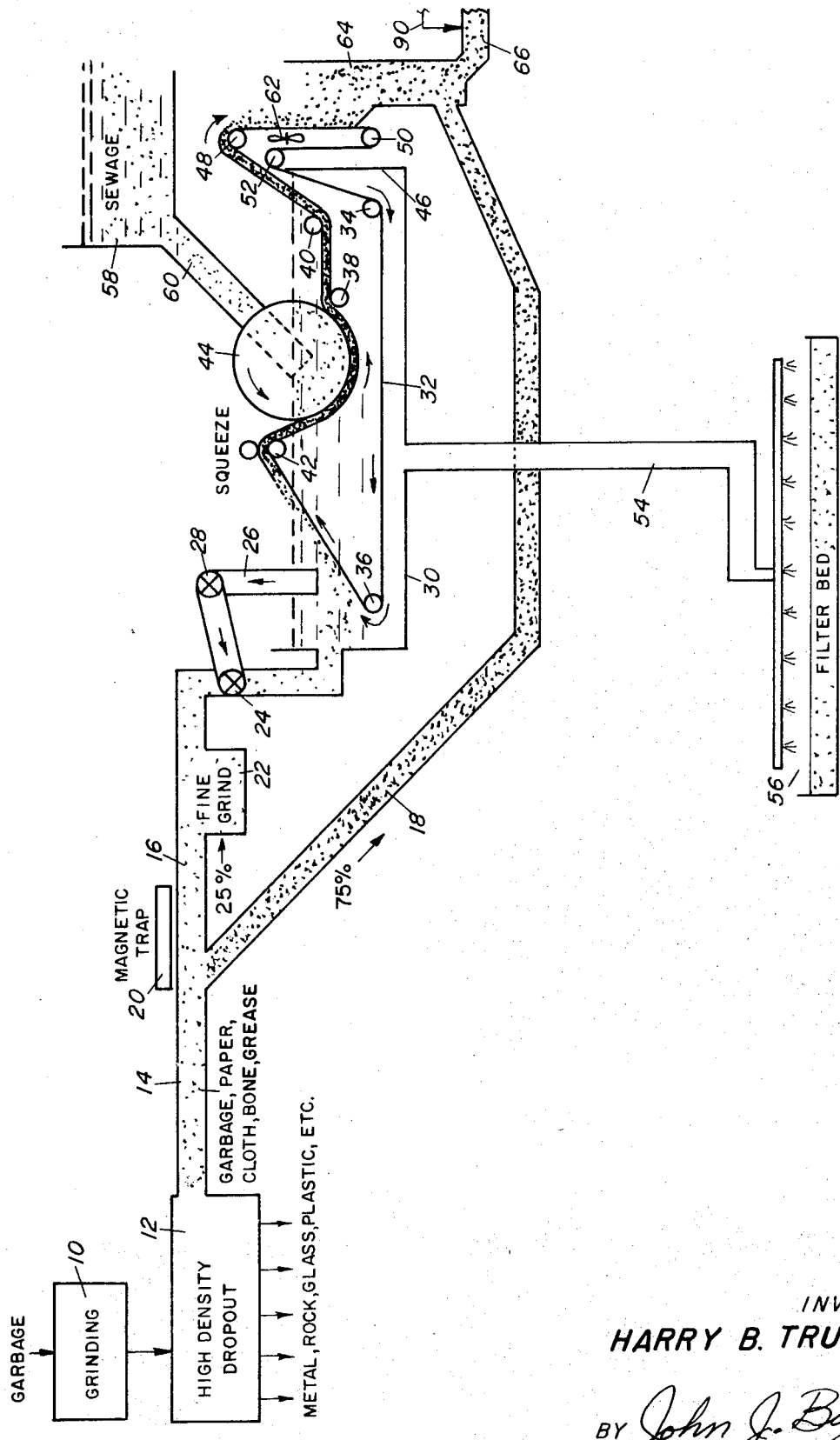
FIG. IA
INVENTOR
HARRY B. TRUSSELL
BY John J. Byrne
ATTORNEY

MUNICIPAL WASTE DISPOSAL

This invention relates to the disposal of waste material and more specifically to the disposal of municipal waste including garbage and sewage.

The disposal of municipal sewage and garbage is a problem of major and increasing dimensions. Many methods now used add considerably to the pollution of streams, land and air in the vicinity of population centers. Organic waste, for example, can pollute a stream or river for a substantial distance downstream of the point of dumping and, if buried underground, can decay and emit offensive odors over a period of years. With the rapid growth in population, the disposal of human waste, averaging 4 pounds of garbage. 0.2 pounds of sewage and 100 gallons of water per capita per day, has become a critical problem. The conventional methods of treating municipal waste have been pushed to their limits by the quantity of waste produced in many populated areas.

Accordingly, it is an object of this invention to provide a system for disposing of municipal waste including garbage and sewage.

It is another object of this invention to provide a system for disposing of large quantities of municipal waste without polluting nearby water, land, or air.

It is another object of this invention to provide a system for disposing of municipal waste by converting the organic portions of garbage and sewage into a food material high in protein and suitable for feeding livestock and other animals.

It is another object of this invention to provide a system for disposing of municipal waste by utilizing the garbage portion of the waste as a filter for the sewage portion.

These and other objects are attained in an illustrative municipal disposal system wherein the garbage portion of the waste is pressed into a filter matrix against the surface of a screen-type conveyor belt. As the belt is moved, sewage is poured onto the matrix and the solids contained therein are carried away and mixed with additional garbage. The liquid portion, which passes through the filter matrix, is purified in a normal manner. The garbage and sewage solids are mixed together, pasteurized and sent to a digester, where bacteria are added to speed dissolution of solids and orient the resultant nutrients, carbohydrates, proteins, fats, vitamins and minerals. Then, the digested product may be fed directly in liquid form or the solids may be separated out and fed as meal or in pellet form.

The operation and advantages of a waste disposal system constructed in accordance with this invention will be more clearly understood by reference to the single FIGURE of the drawing, consisting of 1A and 1B, which shows in partially schematic, partially block diagram form, the construction of a municipal waste disposal system in accordance with this invention.

In the system shown in the figure, the garbage portion of the municipal waste is delivered to a grinding unit 10, where it is ground into small pieces and delivered to high density dropout unit 12. Dropout unit 12 connects to line 14, which splits into lines 16 and 18. Interconnected into line 16 is magnetic trap 20 and fine grind unit 22, the magnetic trap 20 collecting metal objects which remain in the flow after it leaves dropout unit 12. Pump 24 is also connected into line 16 and joins with recycle line 26, including pump 28 connected therein.

Line 16 terminates at filter tank 30. Filter tank 30 contains screen-type conveyor belt 32, which is guided in tank 32 by pulleys 34, 36, 38 and 40, by squeeze unit 42, and by drum 44. Belt 32 also runs above the side wall 46 of tank 30 and over pulleys 48, 50 and 52 outside tank 30. Line 26 leads from the inside of tank 30 to line 16, as described above, and line 54 leads from the bottom of tank 30 to purification system 56, which system can be any of a number of conventional purification systems.

Sewage is accumulated in tank 58 and flows through line 60 into the interior of the foraminous drum 44 which is partially submerged in tank 30. The sewage filters through the drum 44 and the filter matrix deposited on belt 32.

Line 18 terminates in basin 64, which is positioned near belt 32. A blower 62 is located outside tank 30 adjacent belt 32 such that a blast of air can be directed against the underside of the belt. Matter clinging to the surface of belt 32 is blown therefrom into basin 64. Line 66 leads from the bottom of basin 64 and terminates in heat exchanger 68. Within heat exchanger 68 line 70 connects to line 66 and is coiled around line 72. Line 70 connects at the other end to line 74, which passes through pasteurizer 76 and connects to line 72 in heat exchanger 68. The other end of line 72 is connected to line 78, which passes through analyzer 80 to digester 82 where specific varieties of bacteria are added to orient the nutritional elements of the sewage. Digester 82 is connected via line 84 to separator 86. Recycle lines 88 and 90 lead from separator 86 to digester 82 and line 66, respectively. The separator 86 is communicated with pelletizer 94 via line 92. The pellitizer 94 is connected to storage unit 98 via line 96.

In operation, garbage is admitted to the grinding unit 10, and sewage, including both liquids and solids, is collected in tank 58. After the garbage is ground to moderately sized pieces in grinder 10, it is sent to high density dropout unit 12. Dropout unit 12 has a number of slots or openings in its bottom and substantially all of the high-density materials in the garbage, such as metals, rocks, glass and plastic fall through the openings in the bottom of dropout unit 12 and are removed from the system. These inorganic materials do not pose a difficult problem of disposal, since they do not decay and hence can be buried without fear of contributing to air pollution.

The remaining organic garbage is directed through line 14 and split into two channels. Approximately 25 percent of the garbage is directed into line 16 and 75 percent is directed into line 18, the latter being channeled to basin 64 for treatment as described below. The portion directed into line 16 passes through magnetic trap 20, wherein remaining bits of metal are removed. It is then ground into a fine consistency in fine grinder 22 and pumped through pump 24 to tank 30. Tank 30 is normally filled with liquid, as described below, and to increase the fluidity of the garbage the liquid is cycled via line 26 by pump 28 and mixed with the main flow of garbage in pump 24.

As the finely ground garbage arrives at tank 30, it settles through the fluid contained therein onto screen-type conveyor belt 32 which is easily permeated by the fluid in tank 30. After the garbage is deposited on belt 32, it is transported through squeeze unit 42, where it is packed against belt 32 to form a filter matrix. The matrix is then carried by belt 32 until it makes contact with the surface of rotating drum 44, which presses the matrix further against the surface of belt 32.

The sewage accumulated in tank 58 is fed through line 60 to the interior of drum 44. There the liquids are separated from the solids by filtration through the matrix. The solids are caught in the matrix and the liquids seep through the matrix to the bottom of tank 30, where they are channeled through line 54 for treatment in purification unit 56. Thus the liquids are removed from the system and do not contribute to the pollution of the environment.

The solid matter from the sewage, which is retained in the matrix, is carried on belt 52 over edge 46 of tank 30. As it passes blower 62, it is blown from belt 32 and captured in basin 64. There the matrix is mixed with garbage from line 18 and fed through line 66 to heat exchanger 68. Line 66 connects with line 70 in heat exchanger 68, and the garbage-sewage mixture is pre-heated as it flows through line 70. Line 74 carries the mixture from heat exchanger 68 to pasteurizer 76 where it is heated to a predetermined temperature for a certain period of time. The heated mixture leaving pasteurizer 76 re-enters heat exchanger 68 and flows through line 72, giving up heat to the mixture in line 70 in the process. It then exits from heat exchanger 68 and flows via line 78 to analyzer 80, which indicates the quantities of various components, such as protein, protein-free extract, carbohydrates, fats, vitamins, and minerals, present in the mixture. On the basis of the analysis performed in analyzer 80, the mixture is buffered, that is, any deficiencies in the nutritional content of the mixture are remedied so that the result is a balanced basal waste.

After buffering, the mixture is fed to digester 82. Within digester 82, the mixture is inoculated with specific types of bacteria, depending on the composition of the mixture and end requirements. The mixture is generally allowed to digest for a period of about 24 hours. After the period has elapsed, the rate of digestion drops off rapidly and thus it is inefficient to allow it to continue further. The digestion, as is well known, breaks solids into liquids and orients inorganic substances with organic compounds to produce proteins, fats, and sugars in a more readily digestible form.

After digestion, the mixture is virtually converted into an odorless, palatable material suitable for feed and food additives. It is sent through line 84 to a separator 86, where any remaining solids suspended in the liquid are filtered out. After the solids are removed in separator 86, the liquid portion may be recycled through recycle line 88 to digester 82 to achieve higher levels of digestion. Furthermore, after the solids are filtered out in separator 86, the remaining liquid may be recycled, for example, via line 90 to increase the fluidity in line 66 or at any other point in the process. Thereby, the rate of movement is increased.

When the food material is in proper condition for use, it can be de-hydrated and stored either in the form of pellets or as a powder. Illustratively, in the figure, pelletizer 94 converts the product into pellets and delivers them via line 96 to storage unit 98.

The product of this system is a nutritional substance high in protein and having controllable amounts of other nutrients. It is odorless and ideally suited for feeding animals or humans particularly in areas where high protein foods are in short supply.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

I claim:

1. A process of disposing of municipal waste having garbage and sewage portions comprising the steps of
collecting the garbage portion of the waste in one location and collecting the sewage portion of the waste in a second location;
forming a filter matrix out of the garbage portion of the waste by depositing said garbage on a perforate conveyor, squeezing the matrix into a uniform layer,
passing the sewage portion of the waste through the filter matrix such that solids within the sewage are retained on the matrix to form a mixture of garbage-sewage solids, and
digesting the mixture by the addition of bacteria to break solids into liquids and orient inorganic substances to produce proteins, fats, and sugars.

2. A process as in claim 1 wherein the sewage is filtered by pouring it onto the uniform layer of garbage.

3. A process as in claim 2 comprising the step of pasteurizing the mixture after filtration.

4. A process as in claim 3 comprising the steps of
analyzing the mixture to determine the presence of nutrients, vitamins and minerals, and
buffering the mixture by adding quantities of nutrients, vitamins, and minerals to bring the concentration of nutrients, vitamins, and minerals in the mixture to predetermined end levels.

5. A process as in claim 4 comprising the steps of grinding the garbage to moderately-sized pieces and removing rocks, metals, glass and plastic from the garbage prior to forming the filter matrix.

6. A process as in claim 5 comprising the steps of
separating the liquids from the solids in the mixture after digestion, and
recycling the liquids obtained from separation to the digester for further and more complete digestion.

7. A process as in claim 6 wherein the uniform layer of garbage on the conveyor belt passes around a rotating drum having a screen-type exterior and wherein the sewage is admitted to the interior of said drum from the collection point and is passed through the drum to the matrix.

8. A process as in claim 7 comprising the step of pre-heating the mixture in a heat exchanger before pasteurization.

9. A process as in claim 8 comprising the step of purifying the liquid sewage after filtration.

10. A process as in claim 8 wherein the mixture is further heated during pasteurization and wherein said heated pasteurized mixture is used to preheat the mixture prior to pasteurization.

* * * * *